United States Patent [19]
Chuan

[11] Patent Number: 5,214,460
[45] Date of Patent: May 25, 1993

[54] PROJECTOR SLIDE ORIENTATION RECTIFICATION SYSTEM

[76] Inventor: Raymond L. Chuan, 4438 Aku Rd., Hanalei, Hi. 96714

[21] Appl. No.: 787,653
[22] Filed: Nov. 4, 1991
[51] Int. Cl.⁵ .............................................. G03B 23/08
[52] U.S. Cl. .................................... 353/122; 353/103
[58] Field of Search ............... 353/103, 107, 108, 118, 353/112, 122, 95, 120

[56] References Cited

U.S. PATENT DOCUMENTS

| | | |
|---|---|---|
| 2,597,449 | 5/1952 | Cassidy et al. |
| 3,881,814 | 5/1975 | Madison, II ............................ 353/95 |
| 4,176,944 | 12/1979 | Payrhammer ......................... 355/18 |
| 4,249,329 | 2/1981 | Lamb ................................... 353/112 |
| 4,337,398 | 6/1982 | Ohnishi et al. ....................... 250/548 |
| 4,354,745 | 10/1982 | Armstrong ........................... 353/112 |
| 4,420,232 | 12/1983 | Mischenko ............................ 353/25 |
| 4,514,063 | 4/1985 | Wang et al. ........................... 353/28 |
| 4,548,486 | 10/1985 | Mosley ................................. 353/95 |
| 4,858,003 | 8/1989 | Wirt et al. ............................. 353/95 |

Primary Examiner—William A. Cuchlinski, Jr.
Assistant Examiner—William C. Dowling
Attorney, Agent, or Firm—William W. Haefliger

[57] ABSTRACT

A projector slide has eight possible orientations, only one of which is the correct one to project a properly oriented image. For an automatic orientator to work there must be a simple way to recognize any one of the eight orientations and decide how to place the slide in the correct orientation. A method and device is described here which accomplishes this task.

12 Claims, 5 Drawing Sheets

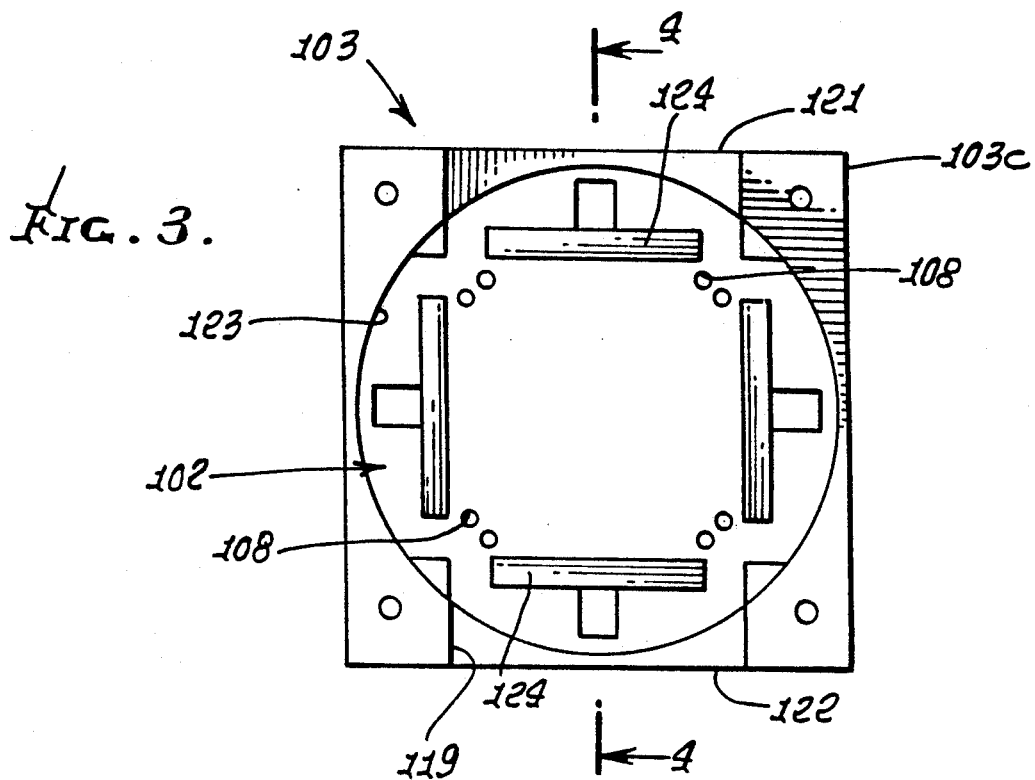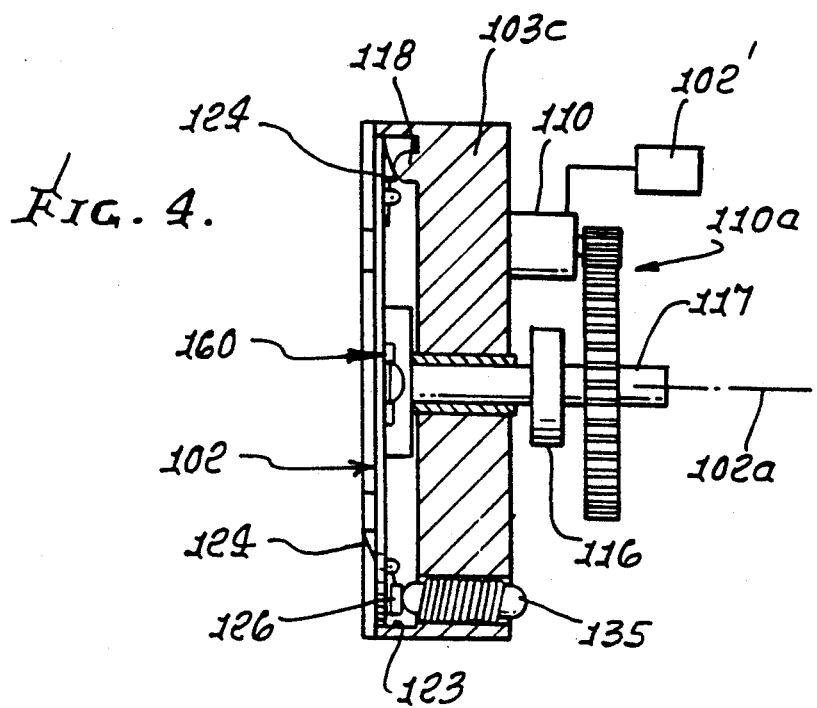

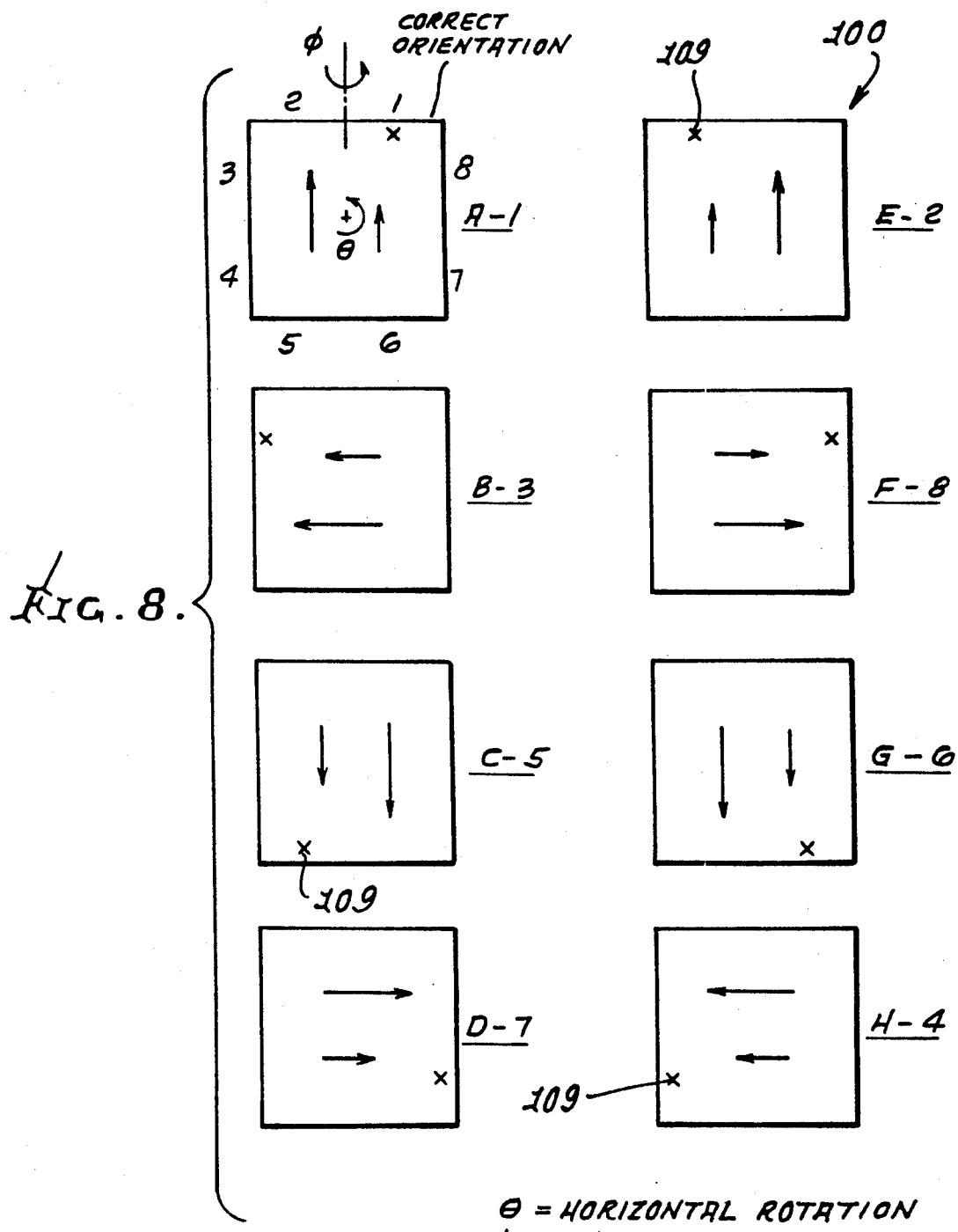

PROJECTOR SLIDE ORIENTATION RECTIFICATION SYSTEM

BACKGROUND OF THE INVENTION

This invention relates generally to projector slide orientation rectification, and more particularly to a system for achieving such rectification in a simple, foolproof manner.

A projector slide has eight possible orientations, only one of which is the correct one to project a properly oriented image via slide projector means. These include four annular slide positions, for each of the two sides of the slide. There is need for method and apparatus to achieve correct slide orientation (i.e. one out of eight possible positions) in a simple, effective way, for supply of such a rectified slide to projector apparatus.

SUMMARY OF THE INVENTION

It is a major object of the invention to provide method and means to meet the above need.

Basically, the system of the invention includes:

a) slide receiving apparatus, b) first means associated with said apparatus to search for the presence or absence of an indicator on the slide frame, c) second means associated with said searching for rotating the slide through a predetermined angular increment or increments, d) third means also responsive to said searching to invert the slide to facilitate completeness of said searching.

As will appear, if an index mark or indicator is placed near one edge of the slide but away from any of the symmetry axes defined by the frame, it will uniquely define the eight possible orientations of the slide. Such axes pass through the center of the slide and to its corners, and the indicator is offset from all of said axes.

It is another object of the invention to provide control means responsive to such searching by the first means, to control the second and third means.

Further objects include the provision in the second means of a rotation actuator for rotating the slide through equal angular increments; each such increment $\theta$ typically being 90°. Also, the third means typically includes an inversion actuator, for inverting the slide through an angle $\phi$ if searching of one side of the slide for the indicator, at all possible positions, yields a negative. Typically, $\phi$ is equal to 180°.

Further, slide projector and/or slide supply hopper means may be operatively connected with the system.

These and other objects and advantages of the invention, as well as the details of an illustrative embodiment, will be more fully understood from the following specification and drawings, in which:

DRAWING DESCRIPTION

FIG. 3 is a frontal view of a slide rotator installed in a second rotator;

FIG. 4 is a section taken on lines 4—4 of FIG. 3;

FIG. 8 is a view showing eight possible slide positions.

DETAILED DESCRIPTION

Figure 1:
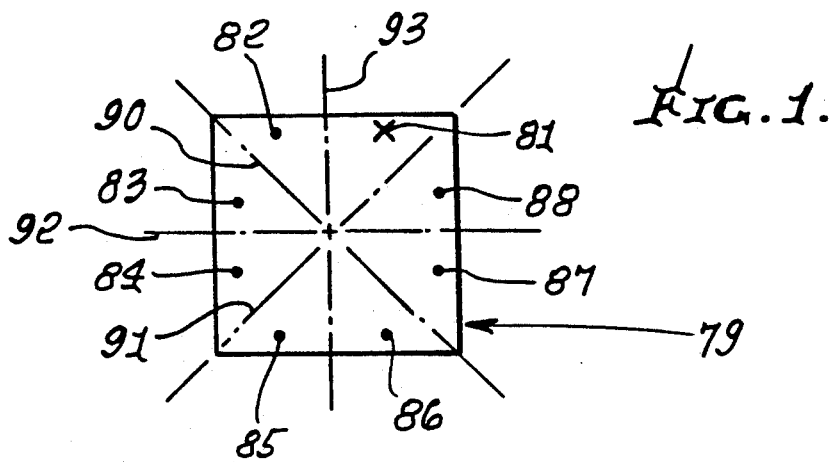
FIG. 1 is a schematic view of a slide and orientations thereof.
Figure 7:
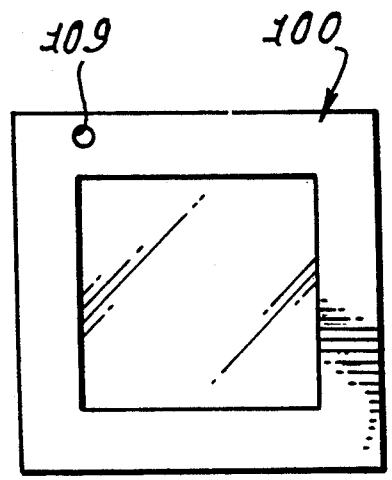
FIG. 7 is a front view of a slide, showing asymmetric location of a light passing window.

Referring first to FIG. 1, a square slide 79 has four axes of symmetry, designated at 90, 91, 92 and 93. If an index mark is placed near one edge of the slide but away from any of the symmetry axes—such as the mark x—it will uniquely define the eight possible orientations of the slide. In the TABLE below, eight orientations, A through H, of the slide are shown, and it is seen that the index mark x is aligned with one of eight uniquely defined positions, marked 81 through 88, also seen in FIG. 1. Four of the orientations A, B, C and D, are in the plane of the correct orientation of the slide; the other four, E, F, G, and H, are mirror images of the first four. The position of the Index for each of the eight orientations is indicated next to the orientation designation. The correct or sought orientation of the slide is A.

Orientations B, C, and D can be returned to A by rotating the slide in-plane through an appropriate angle $\theta$. Orientations E, F, G and H cannot be returned to A by only in-plane rotations. An out-of-plane rotation (about axis 93 for example) $\phi$ must also be executed (flipping) in addition to in-plane rotation. The following table shows the rotations in through angles designated $\phi$ and $\theta$ required to rectify the orientation of the slide.

| Orientation | Position of Index | $\phi$ | $\theta$ |
| --- | --- | --- | --- |
| A | 81 | 0 | 0 |
| B | 83 | 0 | −90 deg |
| C | 85 | 0 | 180 |
| D | 87 | 0 | −270 (or +90) |
| E | 82 | 180 | 0 |
| F | 88 | 180 | −90 |
| G | 86 | 180 | 180 |
| H | 84 | 180 | −270 (or +90) |

The position of the Index x can be detected by any of several methods—optical, mechanical, electrical and magnetic. Given here is an example using optical detection: the slide is placed on a surface with eight optical detectors located at the eight orientation positions designated 81 through 88. A hole punched in the slide at the Index position will line up with one of these eight orientation positions, allowing light to pass and enter a detector in alignment with that position, thus identifying the orientation of the slide. This information is then used to activate the mechanisms for effecting the $\phi$ and $\theta$ rotations listed in the table to return the slide to its correct orientation A.

The flipping of the slide can either be accomplished by grabbing it with a pivoting mechanism or by allowing the slide to free fall in a square chimney and be flipped during the fall either by a mechanical or air jet tripper. At the bottom of the chimney the slide falls onto a turntable which rotates the slide the appropriate angle $\theta$. After this the slide can be pushed out of the turntable either into a stack (of correctly oriented slides) or, better, into a slide magazine. This transfer mechanism is adaptable to the major types of magazines: the Kodak Carousel, the linear or rotary Ansco (or Sawyer) magazine.

Figure 9:
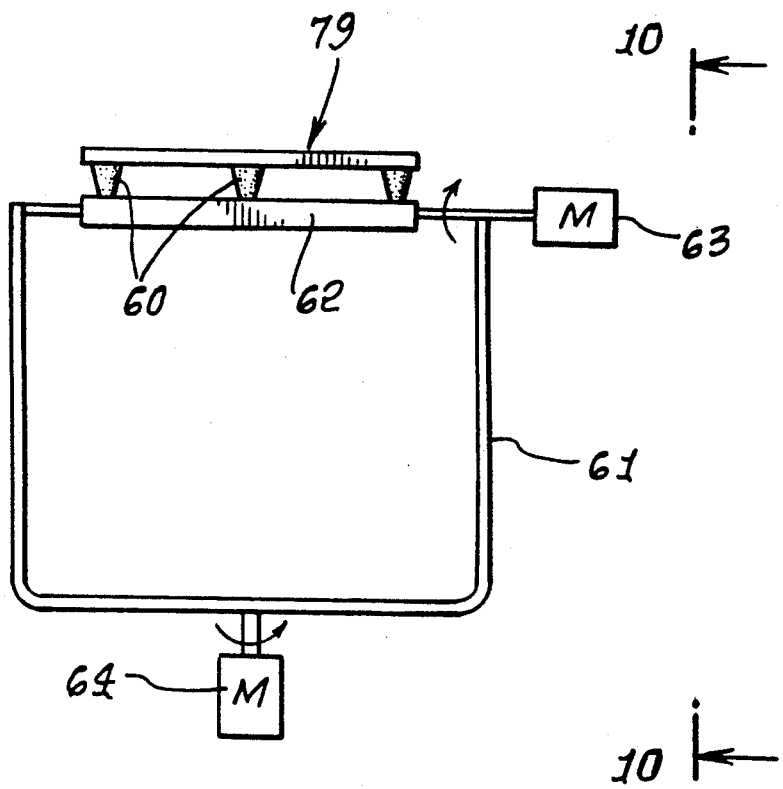
FIG. 9 is a side elevation view showing a slide rotation.
Figure 10:
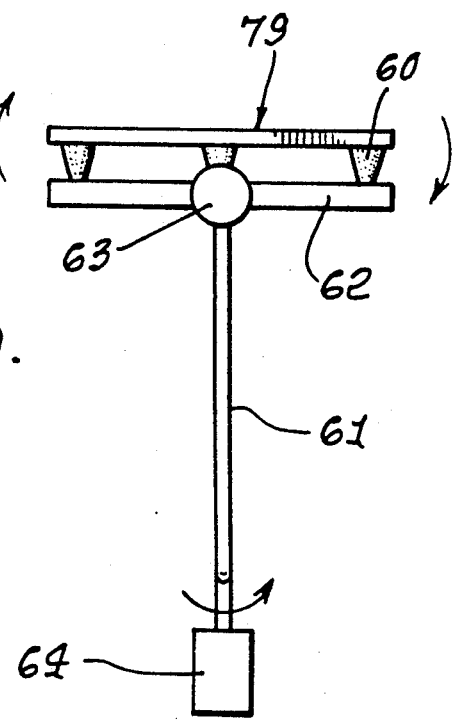
FIG. 10 is an end elevation taken on lines 10—10 of FIG. 9.

Another way of manipulating a slide 79 is to hold it with suction cups 60 attached to a yoke arrangement that can rotate in $\phi$ and $\theta$. See FIGS. 9 and 10 showing yoke 61, platform 62, $\theta$ drive motor 64, and $\phi$ drive motor 63.

The platform which holds the slide by suction cups also contains the detectors for determining the orientation of the slide as received from a feeder stack. The feeder stack is preferably a vertical stack of square cross-section into which slides can be randomly loaded. At the bottom of the feeder stack is a mechanism which allows one slide at a time to be transferred as by pushing to the platform 62 of the orientating mechanism.

Figure 2:
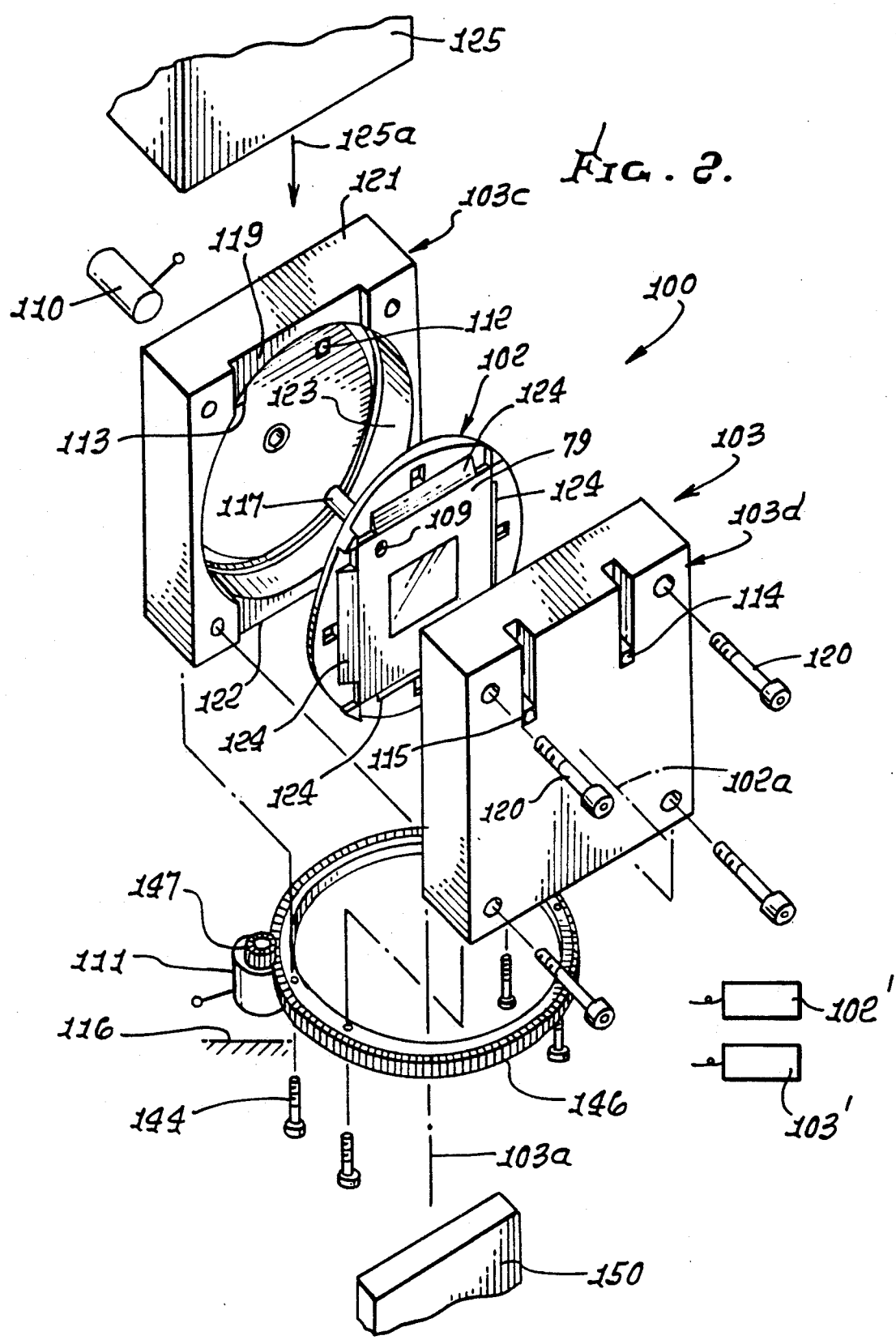
FIG. 2 is an exploded perspective view of apparatus incorporating the invention.

As shown in FIG. 2, the slide orientator apparatus 100 includes two principal components, a first rotator 102 which receives the slide 79 for rotating it about a first axis, such as horizontal axis 102a, and through angle or angles $\theta$; and a second rotator block 103 which carries the first rotator 102 and rotates about a second axis, such as a vertical axis 103a, and through angle or angles $\phi$. Rotator 103 is mounted as by fasteners 144 on a rotary ring gear 146 defining vertical axis 103a. A stepper motor 111 drives the gear 146, as via gear 147, and rotator 103, in rotation, and a stepper motor 110 drives rotator 102 about horizontal axis 102a. Motor 110 is carried by rotator 103 and connected to shaft 117; and motor 111 and gear 146 are carried by fixed frame structure 116. A suitable bearing supports gear 146 for rotation.

Motor 110 effectively rotates the slide through angular increments such as 90° increments, whereby the slide stops at 0°, 90°, 180° and 270° orientations about axis 102a; and motor 111 respectively rotates the slide through 180° increments about axis 103a. Controls for the two motors are indicated at 102', 103', respectively.

Referring to FIG. 2, the rotator 103 is formed in two complementary sections 103c and 103d, held together by fasteners 120. Section 103c has a channel 119 formed thereby, extending between opposite surfaces 121 and 122. That channel also intersects a bore 123 which receives the circular rotator 102, to accommodate rotation of 102 relative to 103, and about axis 102a.

The channel 119 is sized to receive film slides 100, as from a gravity feeder 125, the slides randomly oriented as they are fed. See feed direction 125a. Then they may have any of the positions as seen in FIG. 8, when dropped into the rotators. See the indexing window 109 on the slide, which may have any of the possible positions see at 81-88 in FIG. 1. The position of 109 in FIG. 2 corresponds to FIG. 8, slide position E-2.

The film slide 79 is held in predetermined position in the rotator 102 by stop means, including multiple stops, to be described. Also, the stop means allows discharge of the film, downwardly from the rotators 102 and 103 when the film is correctly oriented by the rotators.

As seen in FIG. 3, there are eight windows 108 on the "horizontal" rotator 102 which align with the eight possible positions of the index window 109 on the slide 79, and corresponding to 81-88 in FIG. 1. The horizontal rotator is driven through the angle by a motor 110 and control circuit 102', so that it rotates in 90° steps only.

There are two light sources 112 and 113 on one section 103c of the split vertical rotator 103, and corresponding detectors 114 and 115 on the opposite section 103d. See FIG. 2. These light source-detector pairs are aligned with positions A-1 and E-2 (as in FIG. 8). The light sources 112 and 113 are turned on only when the horizontal rotator 102 is in one of the four indexing positions at 0, 90, 180 and 270 degrees. This may be accomplished by a four position cam 116 carried by 103c, and which is deflected by appropriate risers on the horizontal rotator shaft 117, driven by motor 110 via gears indicated at 110a. See FIG. 4.

A slide 79 with an indexing window 109 is dropped with a random orientation into the space formed by three of the slide stops 124 (located at corresponding edges of the square slide) and in the horizontal rotator 102. If the indexing window 109 is in neither position A-1 or position E-2, as seen in FIG. 8, both light sources 112 and 113 are blocked from being opened to the detectors 114 and 115. The control 102' then causes horizontal rotator 102 to rotate, in 90° steps, until the indexing window 109 lines up with either 112 or 113, at which time the horizontal rotator stops. If the indexing window 109 stops in alignment with 112, it is in position A-1 and therefore in the correct orientation; the slide stop 124 at the bottom (180°) position is then retracted by action of the solenoid 135 (see FIG. 4), and the slide falls (as through gear 146) into the projector or the slide magazine 150. Control 102' controls that solenoid, and is controlled by sources 112 and 113. If the indexing window 109 stops in alignment with 113, as is depicted in FIG. 2, it is in position E-2 of FIG. 8 and requires a 180° rotation of the vertical rotator 103 to be placed in position A-1. The slide stop 124 at the 180° position is then retracted by action of the solenoid 135, allowing the slide 100 to drop into the projector, or into the slide magazine.

As the horizontal rotator 102 rotates, it can bring the indexing window 109 on the slide 100 into alignment with either 112 or 113, but the alignment is valid only when the horizontal rotator 102 is in one of the four positions 0°, 90°, 180° or 270°. Thus, the light sources 112 and 113 are turned on only when the horizontal rotator 102 is in one of the four positions 0°, 90°, 180° or 270°.

If the vertical rotator 103 is rotated 180°, about a vertical axis, the roles of the two light sources 112 and 113 and their corresponding detectors 114 and 115, with respect to determining the correct orientation in $\phi$ will be reversed. The vertical rotator 103 can be returned to its original position before another slide is inserted, so that light sources 112 and 113 and detectors 114 and 115 return to their original roles; or the control logic can be appropriately reversed to reverse the roles of the light source-detector pairs, without the need to return the vertical rotator 103 to its original position.

Figure 5:
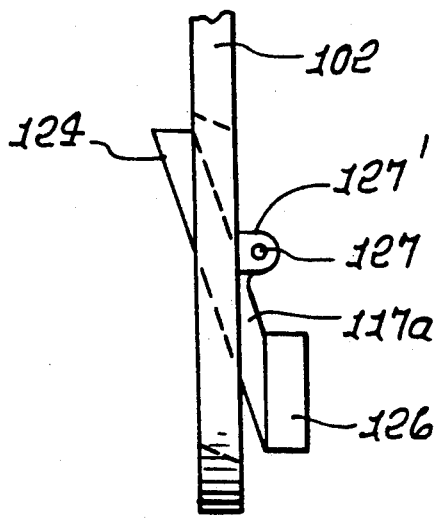
FIGS. 5 and 6 are enlarged schematic views of stop operation.
Figure 6:
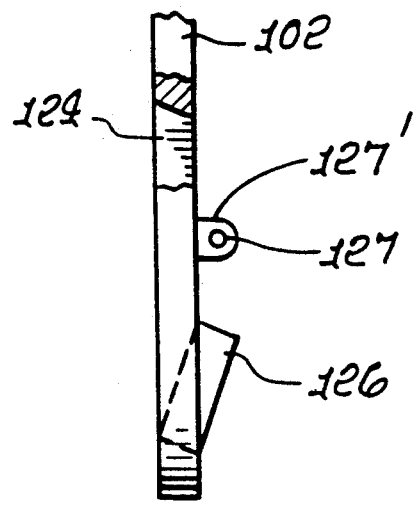

The slide stops 124 are extended or retracted by cam follower actions at positions 0°, 90°, 180° and 270°. The cams are arranged so that the slide stop 124 at (top) position 0° is always retracted by a cam 118 on 103c, acting on a follower 126, while the stops at positions 90° and 270° are always extended in slide edge orienting positions. At the (bottom) 180° position, the follower 126 for a slide stop 124 is actuated by the solenoid 135 acting against the follower 126 of the slide stop 124 pivoting about the axis 127. See FIGS. 5 and 6, also showing arm 117a pivoted at 127', and mounting stop 124 and follower part 126.

See also structure 160 connecting shaft 117 and 102, in FIG. 4.

I claim:

1. In a projector slide orientation rectification system, the slide including a frame and a transparency, the combination comprising
   a) slide receiving apparatus,
   b) first means associated with said apparatus to search for the presence or absence of an indicator on the slide frame,
   c) second means associated with said searching for rotating the slide through a predetermined angular increment or increments,
   d) third means also responsive to said searching to invert the slide to facilitate completeness of said searching.

2. The combination of claim 1 including control means responsive to said searching by said first means, to control said second and third means.

3. The combination of claim 1 including said frame and wherein said indicator comprises a window through the slide frame.

4. The combination of claim 1 wherein said second means includes a rotation actuator for rotating the slide through equal angular increments $\theta$.

5. The combination of claim 4 wherein $\theta$ equals 90°.

6. The combination of claim 1 wherein said third means includes an inversion actuator for inverting the slide through an angle $\phi$.

7. The combination of claim 6 wherein $\phi$ is 180°.

8. The combination of claim 1 including a slide projector operatively connected with said system to receive orientation rectified slides.

9. The combination of claim 1 including a slide supply hopper operatively connected with said system to supply non-orientation rectified slides to said system.

10. The combination of claim 3 wherein the slide frame has major axes that pass through the center of the slide and to the corners of the slide, the indicator offset from said major axes.

11. The combination of claim 1 including slide edge engaging stops on the second means, and activator means on said third means to control said stops to allow a slide to feed into said second means, and to allow a slide to feed from said second means.

12. The combination of claim 11 wherein said actuator means comprises cam means.

* * * * *